(12) United States Patent
Curl et al.

(10) Patent No.: US 7,595,669 B2
(45) Date of Patent: Sep. 29, 2009

(54) METHOD AND APPARATUS FOR PRODUCING CLEAN, UNDISTORTED VARIABLE VOLTAGE 50-60 HZ SINE WAVE

(75) Inventors: Ricky Curl, Pinson, AL (US); Frederick Howell von Herrmann, Homewood, AL (US)

(73) Assignee: The Von Corporation, Birmingham, AL (US)

( * ) Notice: Subject to any disclaimer, the term of this patent is extended or adjusted under 35 U.S.C. 154(b) by 0 days.

(21) Appl. No.: 11/828,681

(22) Filed: Jul. 26, 2007

(65) Prior Publication Data

US 2009/0027092 A1    Jan. 29, 2009

(51) Int. Cl.
*H03B 28/00* (2006.01)
(52) U.S. Cl. .................................................... 327/129
(58) Field of Classification Search ............... 327/110, 327/423, 588, 129
See application file for complete search history.

(56) References Cited

U.S. PATENT DOCUMENTS

| 6,424,188 B2 * | 7/2002 | Kominami ................. 327/110 |
| 6,519,168 B2 * | 2/2003 | Jain et al. ..................... 363/98 |
| 2003/0112040 A1 * | 6/2003 | Yoshimura .................. 327/110 |

* cited by examiner

*Primary Examiner*—Lincoln Donovan
*Assistant Examiner*—John W Poos
(74) *Attorney, Agent, or Firm*—Smith, Gambrell & Russell

(57) ABSTRACT

The invention is directed to a solid-state replacement for a variable transformer. The circuit arrangement presented is not placed in series with the load. It can change output voltage quickly, and is able to deliver more current to the load than is drawn from the source while stepping down because the circuit is not placed in series with a load. The output voltage from the driver circuit is a low-frequency sine wave that is "chopped" by a high frequency carrier, yet the end result after the transformer or LC filter is a very clean sine wave. The circuit arrangement is lightweight and inexpensive to fabricate.

14 Claims, 5 Drawing Sheets

METHOD AND APPARATUS FOR PRODUCING CLEAN, UNDISTORTED VARIABLE VOLTAGE 50-60 HZ SINE WAVE

BACKGROUND AND SUMMARY

Variable transformers have been used for many years to regulate low frequency AC voltage to be fed into an inductive load such as a transformer or motor. These variable transformers suffer from many disadvantages. 0.5 to 300 KVA variable transformers are heavy. They are expensive. They are mechanical (prone to wear). They are not practical for applications where the output voltage needs to be changed quickly.

There have been other attempts at a solid-state replacement for a variable transformer, but most cause extreme distortion of the output wave. Also, most other solid state solutions are placed in series with the load therefore the current delivered to the load can never be greater than the current drawn from the source. In the current invention when operating at a low duty cycle it has the advantage of behaving as a step down transformer to deliver greater current to the load than it draws from the source.

Our inventions provide a solid-state circuit that is lightweight and inexpensive. It is able to change its output voltage quickly.

In a preferred embodiment, Insulated Gate Biploar Transistors (IGBT's) are used as the switching elements, but other types of solid state switches may be used as well, such as MOSFETs and Bipolar power transistors. The transistors we use contain an internal diode between the emitter and collector. If desired, devices without diodes may be used, but a fast recovery diode must be connected externally.

DETAILED DESCRIPTION

Figure 1:
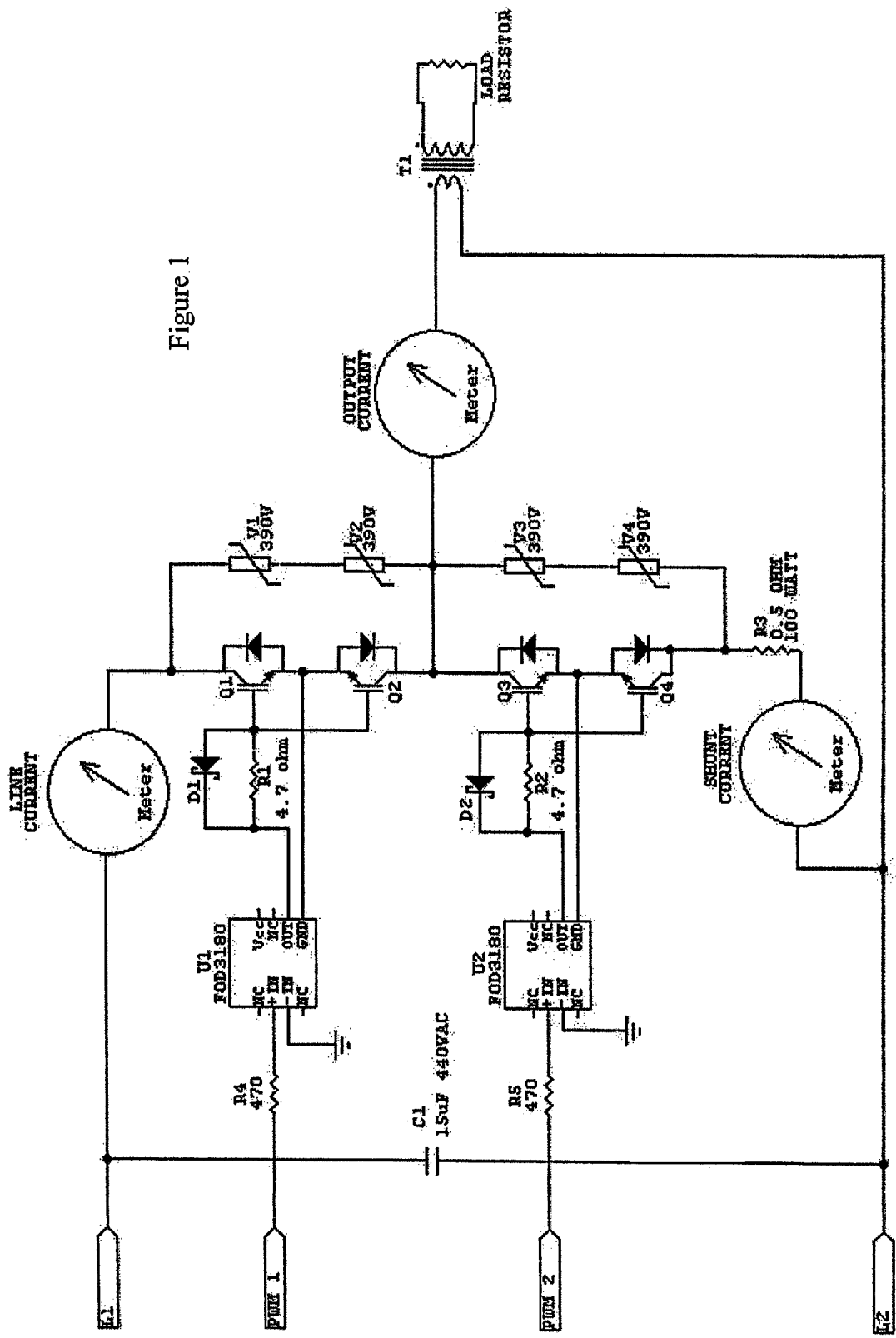
FIG. 1 is a schematic diagram of one embodiment of a circuit according to the inventions.
Figure 5:
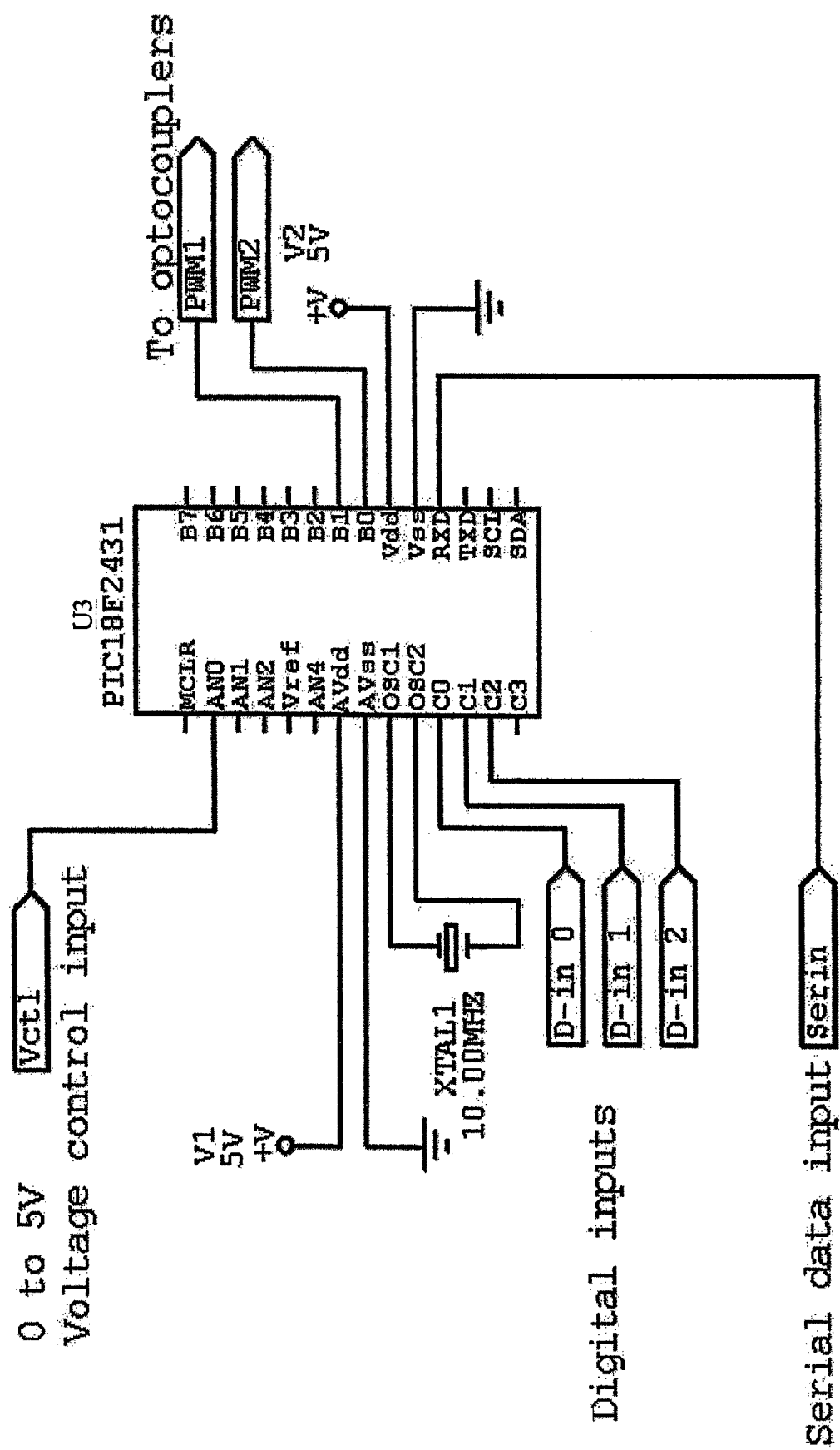
FIG. 5 is a schematic diagram of the microprocessor used in the circuit shown in FIG. 1.

Referring to the drawings for a clearer understanding of the invention. FIGS. 1 & 5 are schematic diagrams of a solid state variable transformer according to inventions described herein. Transistors Q1 to Q4 may be IGBT's and may be implemented using International Rectifier IRGPS40B120UDP transistors with internal ultrafast recovery diode or equivalent transistors. Transistors Q1 and Q2 form a first AC switch in series between the line input and Transformer T1. Q1 feeds power to T1 during the time the AC input is positive in relation to neutral. Q2 feeds power to T1 during the time the AC input is negative in relation to neutral. Transistors Q3 and Q4 form a second AC switch. Q3 provides a shunt across T1 during the time voltage reflected out of the primary is positive in relation to neutral. Q4 provides a shunt across the transformer primary winding during the time the voltage reflected out of the primary is negative in relation to neutral. Both transistors in each switch pair are driven simultaneously. Of course, other transistors can be used as long as circuit parameters are properly adjusted in consideration of the specifications of the transistors selected. Q1 and Q2 are driven through optocoupler U1, with Q3 and Q4 driven through optocoupler U2. U1 and U2 are specifically designed to drive IGBT transistors and can provide drive currents as high as two amps. The power supplies to U1 and U2 are not shown but are 15 volt floating. A PIC or other suitable microprocessor U3 generates a complimentary 19.5 KHz pulse width modulated (PWM) output with adjustable dead time drive signal to the optocouplers Q1 and Q2. R1 and R2 are resistors that limit the speed that the transistors turn on. This reduces overshoot from the transformer and therefore reduces the amplitude of undesirable spikes. D1 and D2 are Schottky rectifiers that ensure the transistors are not inadvertently turned on by the Miller effect when the collector voltage rises quickly. V1 through V4 are varistors to protect the transistors in the event of a voltage spike. C1 prevents high frequency spikes from being reflected out to the power line. The three meters shown in the Figure are not used in the circuit in actuality, but are included in the drawing for purposes of illustration as will become clear hereinafter.

The input voltage between terminals L1 and L2 is 240 VAC. The presently preferred embodiment is designed for 240 VAC. However, other embodiments can be designed for different voltages, thus the stated voltage is used only for purposes of illustration. Transformer T1 is, in the embodiment shown, 1 millihenry inductance and 80 milliohms DC resistance. In the embodiment illustrated, the output of transformer T1 is 40 KVAC at 60 Hz. It should also be noted that the output transformer can be replaced with a simple one-stage LC low-pass filter if it is not necessary to step the output voltage up to a higher or down to a lower voltage than the input.

In a first switch state during the time the AC input is positive in relation to neutral, the collector of Q1 is positive and the collector of Q2 is negative. During the time the switch pair is turned off Q1 sees the entire voltage between its emitter and collector. If there is any leakage in Q1, the diode in Q2 will conduct. The voltage across Q2 will be less than a volt. During the time the switch pair is turned on Q1 begins to pass current to transformer T1. Even though Q2 is reverse-biased, it will still conduct. This reduces the voltage drop across Q2 to less than the drop that would normally be seen across the internal diode alone.

In a second switch state during the time the AC input is negative in relation to neutral, the collector of Q2 is positive and the collector of Q1 is negative. During the time the switch pair is turned off Q2 sees the entire voltage between its emitter and collector. If there is any leakage in Q2, the diode in Q1 will conduct. The voltage across Q1 will be less than a volt. During the time the switch pair is turned on Q2 begins to feed current to the load. Even though Q1 is reverse-biased, it will still conduct. This reduces the voltage drop across Q1 to less than the drop that would normally be seen across the diode alone.

Switch pair Q3 and Q4 behave identically to the Q1-Q2 pair, as described above however, instead of providing power to T1, they act as a shunt to T1. For the remainder of this description Q1 and Q2 will be referred to as the first switch pair and Q3 and Q4 will be described as the second switch pair.

Figure 2:
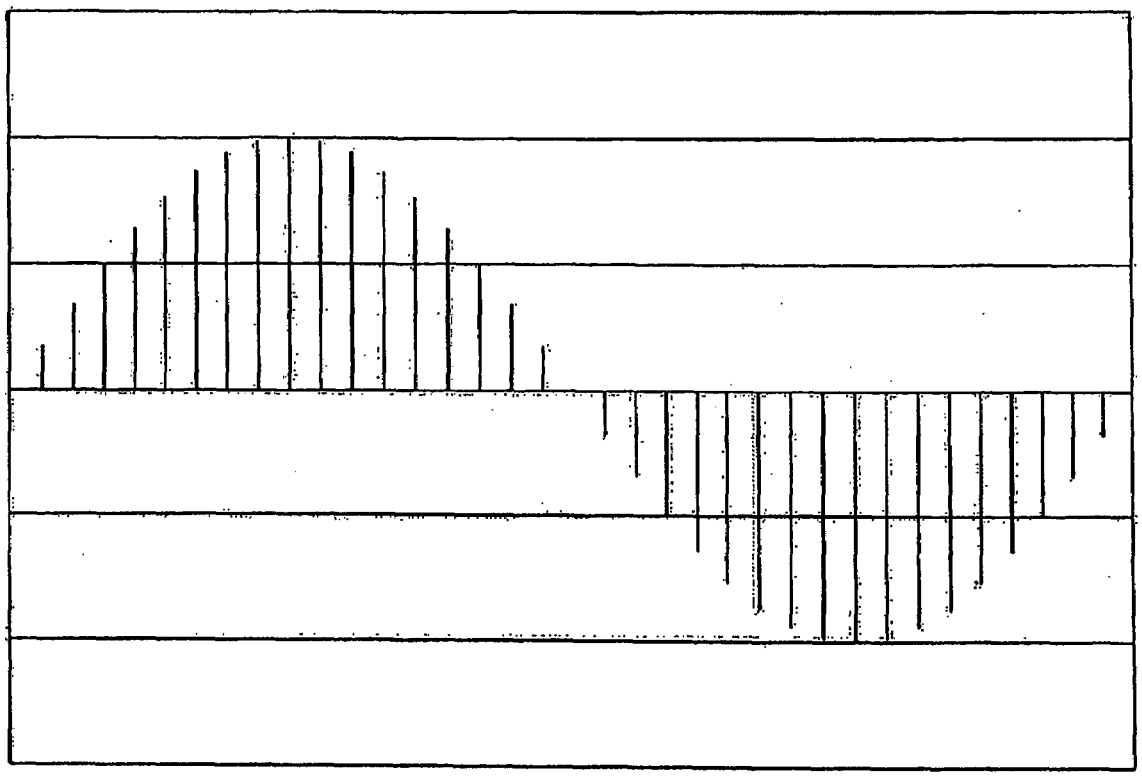
FIG. 2 illustrates input to a transformer at a 10% duty cycle.

FIG. 2 illustrates input to a transformer at a 10% duty cycle. By 10% duty cycle" we mean that the first transistor pair is on for 10% of the time, then there is a very brief (microseconds) dead time during which all transistors are off, followed by the second transistor pair being on for 90% of the time. The circuit shown in FIG. 1 produces a clean undistorted variable voltage 50 or 60 Hertz sine wave at the output of a transformer driven by this circuit. This is accomplished by switching the low frequency AC input voltage with a variable-width high frequency carrier (typically 19.5 Khz.). At low duty cycle, the upper switch pair is only turned on for a very short time, therefore energy is only delivered to the load for a short time. As the magnetic field in the transformer begins to build, current increases. That is to say, when the first switch pair is turned on either Q1 or Q2 will conduct in series with the primary of T1, thus building the magnetic field about the primary and an output in the secondary.

When the upper switch pair is turned off, the field begins to collapse and the voltage across the transformer primary begins to increase. At this point the lower switch pair is turned on, placing an effective short circuit across the transformer primary. At this point the current through the load and through the bottom switch pair increases to a high value. A current meter at location C in the circuit would not differentiate between the two currents other than to see a higher current. R3 limits this current to a safe value. The actual current measured in a working circuit is 2 amps at meter location A from the line (same as the current passing through the upper transistor pair), 10 amps at meter location B into the transformer, and 8 amps at meter location C through the lower transistor pair. The current passing through this lower transistor pair is what allows this circuit to deliver a higher current to the transformer than what is drawn from the line while the circuit is "stepping down" the amount of energy delivered to the transformer. This is exactly the way a variable transformer would behave when stepping down the output voltage.

Figure 3:
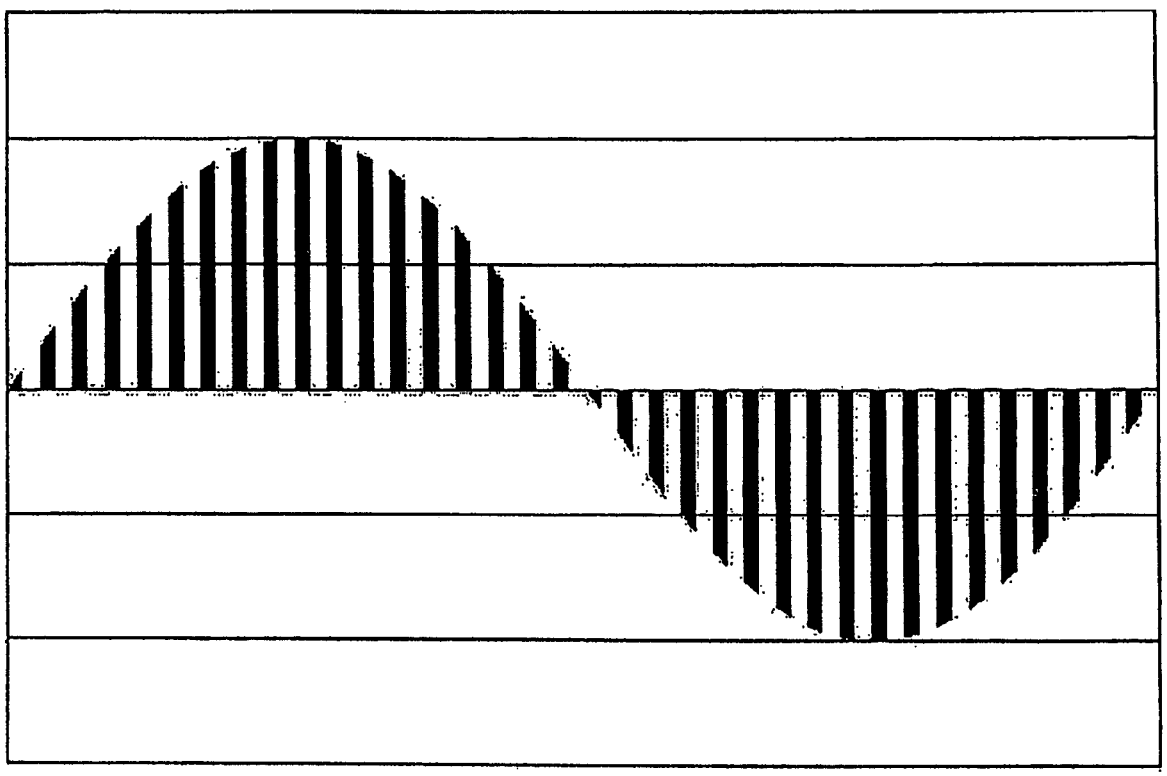
FIG. 3 illustrates input to a transformer at a 50% duty cycle

FIG. 3 illustrates input to a transformer at a 50% duty cycle. At higher duty cycles, the upper switch pair is turned on for a longer time, thus current delivered through the upper switch pair becomes higher, and the current through the lower switch pair begins to decrease as the duty cycle increases. With a higher duty cycle, say around 50%, the current through the two transistor pairs is about equal. Typical current readings in this condition is 5 amps at meter location A from the line, 10 amps at meter location B into the transformer, and 5 amps at meter location C through the lower transistor pair. At high duty cycles, the top pair is carrying most of the current and very little is flowing through the lower pair, so the current into the transformer is equal to the current being drawn from the input. With an increase in duty cycle comes an increase in voltage at the secondary of the transformer.

Figure 4:
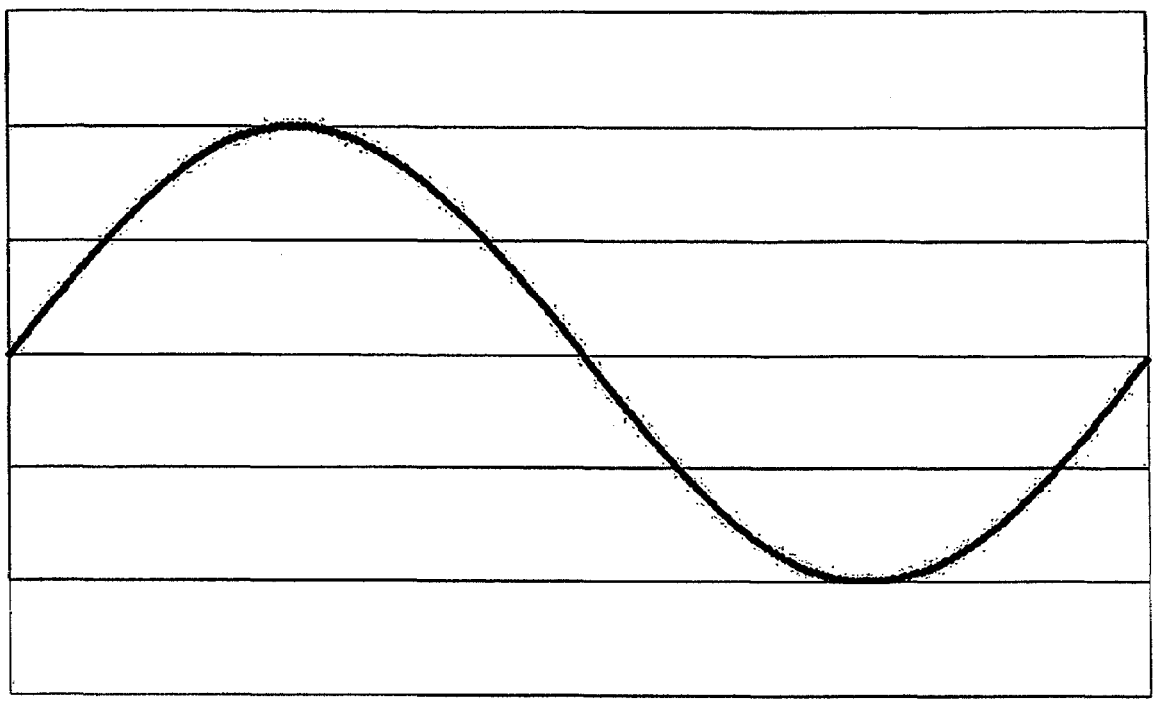
FIG. 4 shows output from a transformer driven by the circuit.

FIG. 4 shows output from a transformer driven by this circuit. Since the core material in a transformer designed for 50 or 60 hertz is extremely inefficient at 19.5 Khz, the transformer acts as a low-pass filter and will produce a clean sine wave at its output, even though the 50 or 60 hertz input is being chopped at 19.5 Khz. That is to say, the output voltage from our driver circuit is a low-frequency sine wave that is "chopped" by a high frequency carrier, yet the end result after the transformer or LC filter is a very clean sine wave While this circuit resembles a commonly-used power supply configuration there are two key differences: 1) the circuit is supplied with AC, where traditional circuits are DC only, and 2) the switch pairs are capable of switching AC.

The following are some of the advantages achieved by circuit arrangements according to the inventions described herein.

The output voltage of the driver circuit never changes; only the duty cycle changes. There is no need to synchronize the high frequency carrier with the 50 or 60 hertz input frequency. No adjustments are necessary when changing between 50 and 60 hertz input frequencies. The high frequency carrier is generated by any suitable microprocessor chip, such as a PIC among others. The microprocessor has multiple A/D inputs that are used to control the duty cycle and thus the output voltage. Of course, digital input may used, such as a serial input to command the output to a specified voltage, or applying a 1 or 0 to a specific pin to trigger a preset voltage output ramp. Microprocessor U3 also generates a "dead time" over which neither switch pair is turned on. This avoids a destructive "cross-conduction" situation. The driving voltage for the switching transistors is provided by two floating power supplies. Each power supply drives an optocoupled IGBT driver chip. Constant voltage or constant current output is easily accomplished by providing a feedback loop from the voltage or current output and the A/D input of the microprocessor that generates the carrier. A snubber is not necessary because one of the switch pairs is always on except during the dead time. The dead time is so short that the field in the output transformer does not have time to collapse far enough to generate a voltage high enough to damage the transistors.

Alternative embodiments are possible. For example, it is possible to use MOSFET transistors or Bipolar power transistors as switching elements. MOSFETS are good for high current at low voltages but are not appropriate for higher voltages. Bipolar power transistors may be used at higher voltages, but the driving circuits are complicated and inefficient.

In all embodiments of the inventions, it is important that the switching frequency be many times higher than the frequency of the input power to take advantage of the filtering effect of the transformer. If the two frequencies are too close together, some of the switching frequency will appear at the output. 19.5 KHz, the frequency that we use, is in the "sweet spot" however, the usable range of frequencies is not limited to 19.5 KHz but rather is determined by the desired output frequency and the physical limitations of the components. That is to say when a lower switching frequency closer to the desired output frequency is used some of the switching frequency leaks through to the output. Higher frequency switching frequencies are limited by the inherent switching losses in the transistors and the core losses in the transformer which come into play. Thus in the embodiment shown 19.5 KHz is optimum, but any other frequency approximating the same differential between the output frequency of 50 to 60 Hz and 19.5 KHz provides acceptable results.

The specific circuit required to drive is within the skill of the artisan in this field, thus it well known to generate driver or chopper frequencies using a 10 MHz crystal and a suitable microcontroller that are not too fast for medium-sized IGBT's to switch efficiently. Similarly, there are optically-coupled driver chips, such as a Fairchild FOD3180, available that will run at frequency ranges including 19.5 KHz, and will drive the IGBT switches efficiently in these frequency ranges.

While we have shown our invention in a single embodiment, it is not so limited and is intended to encompass the full scope of the appended claims, which form a part of this disclosure.

What we claim is:

1. An apparatus use in an AC circuit for producing a clean, undistorted variable voltage sine wave comprising:

A first AC solid state switch driven at a switching frequency substantially greater than a low frequency input voltage;

A second AC solid state switch driven at said switching frequency;

A microprocessor, generating said switching frequency, operatively coupled to said AC switches such that said first AC switch can be iteratively turned on for a variable period and such that second AC solid state switch is turned on at a selected time after said first AC switch has been turned off and turned off a selected time before said first AC switch is turned on; and, A transformer having a primary operatively coupled to said first switch and said second switch such that the voltage at a secondary of said transformer varies with the period of time said first AC switch is turned on.

2. Apparatus as defined in claim 1 wherein said first AC solid state switch is connected in series between the power source and said primary of said transformer and said second AC solid state switch is connected in parallel with said primary of said transformer.

3. Apparatus as defined in claim 1 where in said microprocessor selectively varies the period of time said first AC switch is on during each cycle of said switching frequency to vary the magnitude of the output voltage across said secondary.

4. Apparatus for use in an AC circuit for producing a clean, undistorted variable voltage sine wave comprising:
   A first AC solid state switch driven at a switching frequency substantially greater than a low frequency input voltage,
   A second AC solid state switch driven at said switching frequency;
   A microprocessor, generating said switching frequency, operatively coupled to said AC switches such that said first AC switch can be iteratively turned on for a variable period and such that second AC solid state switch is turned on at a selected time after said first AC switch has been turned off and turned off a selected time before said first AC switch is turned on, wherein said microprocessor selectively varies the period of time said first AC switch is on during each cycle of said switching frequency; and,
   A transformer having a primary operatively coupled to said first switch and said second switch such that the voltage at a secondary of said transformer varies with the period of time said first AC switch is turned on wherein said first AC solid state switch comprises a first transistor operatively coupled in series to said primary to provide current thereto when said low frequency voltage across the transformer primary is positive relative to neutral and a second transistor operatively coupled in series to said primary to provide current thereto when said low frequency voltage across the transformer primary is negative relative to neutral.

5. Apparatus as defined in claim 4 wherein said second AC solid state switch comprises a third transistor operatively coupled in parallel with said primary to provide a shunt across said primary when said low frequency voltage across the transformer primary is positive relative to neutral and a fourth transistor operatively coupled in parallel with said primary to provide a shunt there across when said low frequency voltage across the transformer is negative relative to neutral.

6. Apparatus for use in an AC circuit for producing a clean, undistorted variable voltage sine wave comprising:
   A first AC solid state switch driven at a switching frequency substantially greater than a low frequency input voltage;
   A second AC solid state switch driven at said switching frequency;
   A microprocessor, generating said switching frequency, operatively coupled to said AC switches such that said first AC switch can be iteratively turned on for a variable period and such that second AC solid state switch is turned on at a selected time after said first AC switch has been turned off and turned off a selected time before said first AC switch is turned on, wherein said microprocessor selectively varies the period of time said first AC switch is on during each cycle of said switching frequency; and,
   A transformer having a primary operatively coupled to said first switch and said second switch such that the voltage at a secondary of said transformer varies with the period of time said first AC switch is turned on, wherein said second AC solid state switch comprises a third transistor operatively coupled in parallel with said primary to provide a shunt across said primary when said low frequency voltage across the transformer primary is positive relative to neutral and a fourth transistor operatively coupled in parallel with said primary to provide a shunt there across when said low frequency voltage across the transformer primary is negative relative to neutral.

7. Apparatus as defined in claim 1 wherein said transformer has a voltage output which is a multiple of the input voltage.

8. An apparatus use in an AC circuit for producing a clean, undistorted variable voltage sine wave comprising;
   A first AC solid state switch driven at a switching frequency substantially greater than a low frequency input voltage;
   A second AC solid state switch driven at said switching frequency;
   A microprocessor, for generating said switching frequency, operatively coupled to said AC switches such that said first AC switch can be iteratively turned on for a variable period and such that second AC solid state switch is turned on at a selected time after said first AC switch has been turned off and turned off a selected time before said first AC switch is turned on; and,
   A transformer having a primary operatively coupled to said first switch and said second switch such that the voltage at a secondary of said transformer is a multiple of the voltage across the primary of said transformer whose magnitude varies with the period of time said first AC switch is turned on wherein said transformer is a low pass filter.

9. A method for producing a clean, undistorted variable voltage sine wave comprising;
   Applying a low frequency input voltage to a primary of a transformer having a secondary across which an output voltage is generated,
   Driving a first AC solid state switch connected in series with said primary at a switching frequency substantially greater than a low frequency input voltage;
   Driving a second AC solid state switch, connected as a shunt across said primary, at said switching frequency, such that said first AC switch is be iteratively turned on for a variable period and such that second AC solid state switch is turned on at a selected time after said first AC switch has been turned off and turned off a selected time before said first AC switch is turned on.

10. A method as defined in claim 9 wherein said first AC switch has a variable period of conduction during each cycle of said switching frequency.

11. A method as defined in claim 10 further comprising generating said switching frequency with a microprocessor and controlling the first and second AC switches with said microprocessor.

12. An apparatus use in an AC circuit for producing a clean, undistorted variable voltage sine wave comprising:
   a. an input from a source of low frequency alternating current at a predetermined voltage;
   b. a microprocessor generating high frequency switching signals substantially greater than said low frequency;

c. a plurality of AC switches connected across said low frequency AC input and being connected to said microprocessor for receiving said high frequency switching signals actuating said AC switches to selectively chop said low frequency AC to yield a selectively variable low frequency AC voltage output at the secondary of a component selected from a transformer or a low pass filter.

13. Apparatus as claimed in claim 12 further comprising a low frequency transformer having a primary operatively coupled to one of said plurality of AC switches in series such that the voltage at a secondary of said transformer varies with the period of time said one AC switch is turned on by said high frequency signals.

14. Apparatus as claimed in claim 12 further comprising a low pass filter connected to said low frequency AC voltage output and having an output there from.

* * * * *